United States Patent [19]

Mead

[11] 3,959,774

[45] May 25, 1976

[54] PROCESSOR WHICH SEQUENCES EXTERNALLY OF A CENTRAL PROCESSOR

[75] Inventor: Carver Mead, Pasadena, Calif.

[73] Assignee: California Institute of Technology, Pasadena, Calif.

[22] Filed: July 25, 1974

[21] Appl. No.: 491,647

[52] U.S. Cl. .......................................... 340/172.5
[51] Int. Cl.[2] .......................................... G06F 9/16
[58] Field of Search .................................. 340/172.5

[56] References Cited
UNITED STATES PATENTS

| | | | |
|---|---|---|---|
| 3,478,322 | 11/1969 | Evans | 340/172.5 |
| 3,675,214 | 7/1972 | Ellis et al. | 340/172.5 |
| 3,748,649 | 7/1973 | McEowen et al. | 340/172.5 |

Primary Examiner—David H. Malzahn
Attorney, Agent, or Firm—Lindenberg, Freilich, Wasserman, Rosen & Fernandez

[57] ABSTRACT

An arrangement for organizing a computer is provided wherein all instructions in programs required for data processing, including memory addresses, are generated and processed outside of the central processor unit by using programmable logic arrays. Programmable logic arrays are also used for program supervision and for controlling peripheral hardware. Thus, the central processor unit is left to perform solely data processing and need not do any non-data processing functions.

14 Claims, 5 Drawing Figures

PROCESSOR WHICH SEQUENCES EXTERNALLY OF A CENTRAL PROCESSOR

ORIGIN OF THE INVENTION

The invention herein described was made in the course of work performed under a contract with the Office of Naval Research.

FIELD OF THE INVENTION

This invention relates to data processing systems and more particularly to improvements therein.

The basic organization of a computer, or data processing machine, is one wherein the program to be performed is stored in memory. In the operation of the machine, an address of an instruction, which is part of the program, is used for reading that instruction out of memory. The instruction is performed, its completion is recognized, and then the address of the next instruction is calculated and is read out of memory. The central processor unit has to supervise system operation and to calculate instruction addresses and data memory addesses. It also has to calculate data. Also, if any peripheral hardware such as printers or tape handling systems or display systems are to be supervised, this is done by the central processor unit. It has been estimated that something over 90% of the cycles of a computer are devoted to sequencing the machine and doing a control operation rather than to actually process data. This constitutes a waste of time, in effect, a "constipation" of the machine by forcing all operations to go through one piece of hardware.

Attempts at reducing the load on the central processor unit have been made, to enable a speed-up of the data processing operation. These attempts have consisted of distributing both the programming and data processing load on the central processor unit by providing components which include some memory (often read only memory), storing truth tables, some addresses and some program steps. However, the monitoring of the operation of these various components, that is, the supervisory function, is still the function of the central processor unit. Thus the CPU is still used for performance of duties other than data processing, particularly the control and sequencing of the machine. Also, in these systems, branches and loops which are a part of the program normally are left to be performed by the central processor unit, (CPU).

OBJECTS AND SUMMARY OF THE INVENTION

It is an object of this invention to provide an organization for a data processing machine wherein supervisory functions, issuing of instructions, branch and loop functions are performed by circuits outside of the central processing unit.

It is a further object of this invention to provide an improved organization for a data processing machine which enables faster and more efficient operation of the machine.

It is still another object of the present invention to provide a novel and unique organization for a data processing machine.

These and other objects of the invention are achieved by employing a plurality of sequential logic circuits comprising AND gate and OR gate arrays and interior machine state storage elements known as programmable logic array circuits, (PLA), to perform the function of instruction generating, performance of loops and branches, peripheral hardware control, i.e., substantially all the control and sequencing functions of a computer. Data processing is solely a function of the central processor unit. In addition, a separate processing unit is provided to compute data memory addresses and control the data memory, apart from the CPU, which is reserved for performing functions on the data itself.

DESCRIPTION OF THE PREFERRED EMBODIMENT

The basic circuit component which is used in this invention is known as a programmable logic array. This is a circuit arrangement which can implement random logic using programmable techniques. The programmable logic array structure, (hereafter referred to as PLA), basically comprises an array of AND gates adjacent to an array of OR gates which are on a chip with a feedback arrangement between the arrays.

Figure 1:
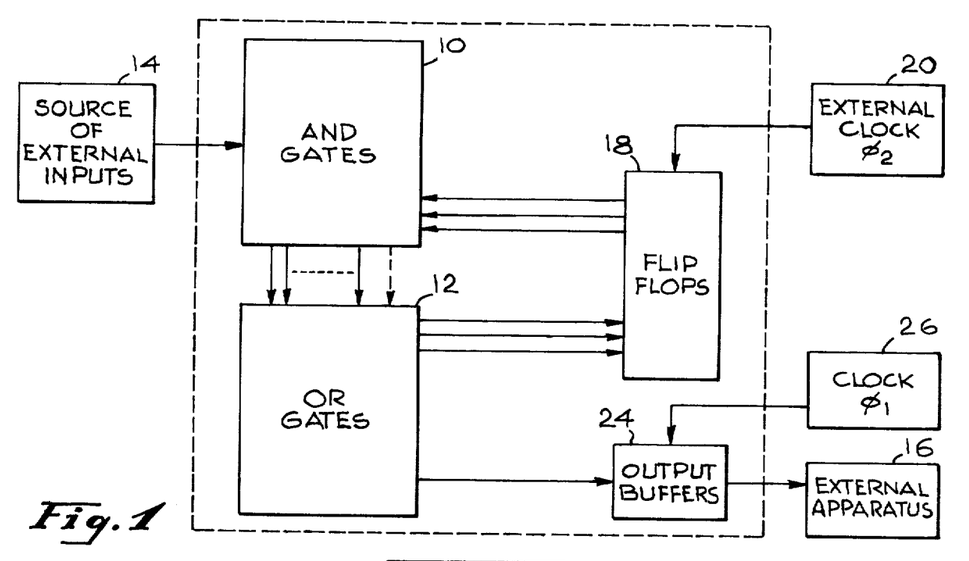
FIG. 1 is a schematic drawing of a Planned Logic Array.

Any logic equation can be expressed as a sum of products or as a product of sums. The AND gate array generates the product terms and the OR gate array generates the sum of the product terms. Flip flops (or dynamic storage elements) are used in feedback loops between OR gate array outputs and AND gate array inputs to permit implementation of the sequential logic. Sequential logic is what is performed by these arrays. Complete information on the circuit structure of these arrays is found in the literature and also is provided in the form of a text for a course given by Texas Instruments Inc., of Dallas, Texas, entitled "The MOS Course Supplement," and the title of the specific article in said text is "MOS/LSI Programmable Logic Arrays," published in 1971 by Texas Instruments Inc. Effectively, it is indicated that the PLA is actually a big read only memory (ROM) with a programmable, non-exhaustive decode section, that has been adapted to the implementation of random logic. The PLA can be custom programmed, for example, by the use of a photographic mask, to provide a desired arrangement for the logic gates. A functional diagram of a PLA is shown in FIG. 1. It comprises a product term generator matrix 10, which actually is the AND gate matrix, which feeds its product term outputs to a sum of product term generator 12, which is the OR gate matrix. External inputs designated by the rectangle labeled "source of external inputs" 14, comprises the inputs to the AND gate matrix. Some of the outputs from the OR gate matrix 12 are fed out to external apparatus 16. Other outputs are applied to flip flops 18, which are driven both in response to the OR gate matrix output as well as in response to an external clock 20, or clocks.

The term "flip flop" is used here to denote any storage element, including dynamic types, which are not necessarily of the conventional cross coupled type.

The external inputs from the source 14 are applied to the AND gate array 10 which, with the outputs from the flip flops 18 forms as output which is applied to the OR gate array. The OR gate array outputs may be either fed back to the flip flops, or supplied to the output buffers, or both. In this manner, the PLA can sequence in response to the external inputs, and to the programmed logic, to perform logical functions, such as providing instruction codes, performing loops or branches in response to signals which have been received from other parts of the system, providing output instructions, memory addresses, and controlling external peripheral apparatus.

Effectively, the PLA is used to remove all of the sequencing and control operations out of the central processor and to perform all of these operations itself. When this happens, the machine can function much more rapidly since it does not have to wait for the CPU to process the data, calculate an address for the next program step or instruction required, or examine the instruction to see if it is a branch, etc., since with the new arrangement the next instruction is waiting for use when required.

Figure 2:
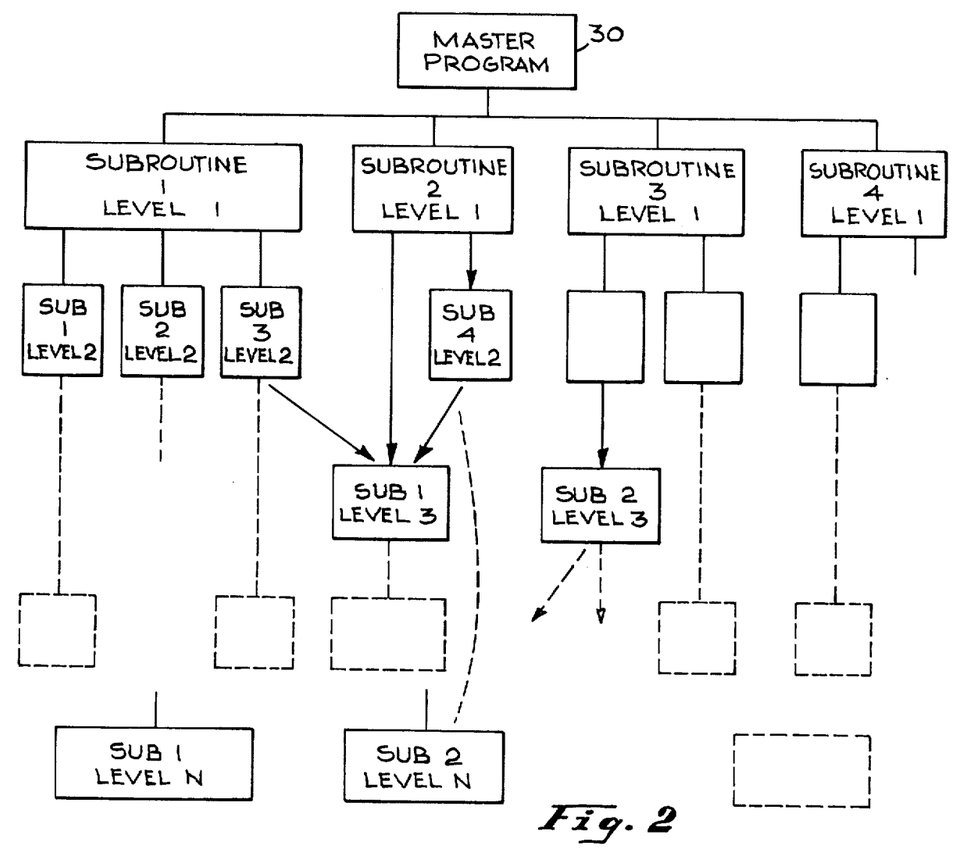
FIG. 2 is a block diagram illustrating an exemplary programming hierarchy.

FIG. 2 is a block diagram illustrative of a computer program organization, which is shown to afford a better understanding of this invention. The rectangle designated as master program 30 can call any one of a plurality of sub-routines, here exemplified as sub-routines 1, 2, 3, and 4 at level one. These sub-routines can be performed by the machine and can also call upon sub-routines at lower levels to be performed. Lower level routines are further exemplified at level two by sub-routine 1, 2, 3, 4 . . . , at level two. Also, any sub-routine at level one can call for the execution of a sub-routine at a lower level than level two. A still lower level sub-routine is exemplified by a sub-routine 1 at level three. The sub-routines at level two may call upon subroutines in level three, as shown by the arrows extending between sub-routine 1, level three and sub-routine 3, level two, and sub-routine 4, level two.

This type of a tree branching organization of the sub-routines occurs until one gets down to the lowest level sub-routine exemplified by sub-routines 1 and 2 at level N which can be called upon for execution by any of the higher order sub-routines in the manner described.

The restrictions on the organization shown are that no lower order sub-routine can call a higher order sub-routine to be performed or one on its own level, and therefore no sub-routine can call or select a sub-routine which called it.

The organization shown in FIG. 2 for the program and its sub-routines is the organization which will be followed by the PLAs in this system. However, it will be recognized by those skilled in the art that this is exemplary and not to be construed as limiting. Also, the restrictions indicated are applicable to the PLAs, namely that no PLA can call a sub-routine to be performed by a PLA which called it to perform a sub-routine. Further, there is only one level of sub-routine in any one PLA.

Figure 3:
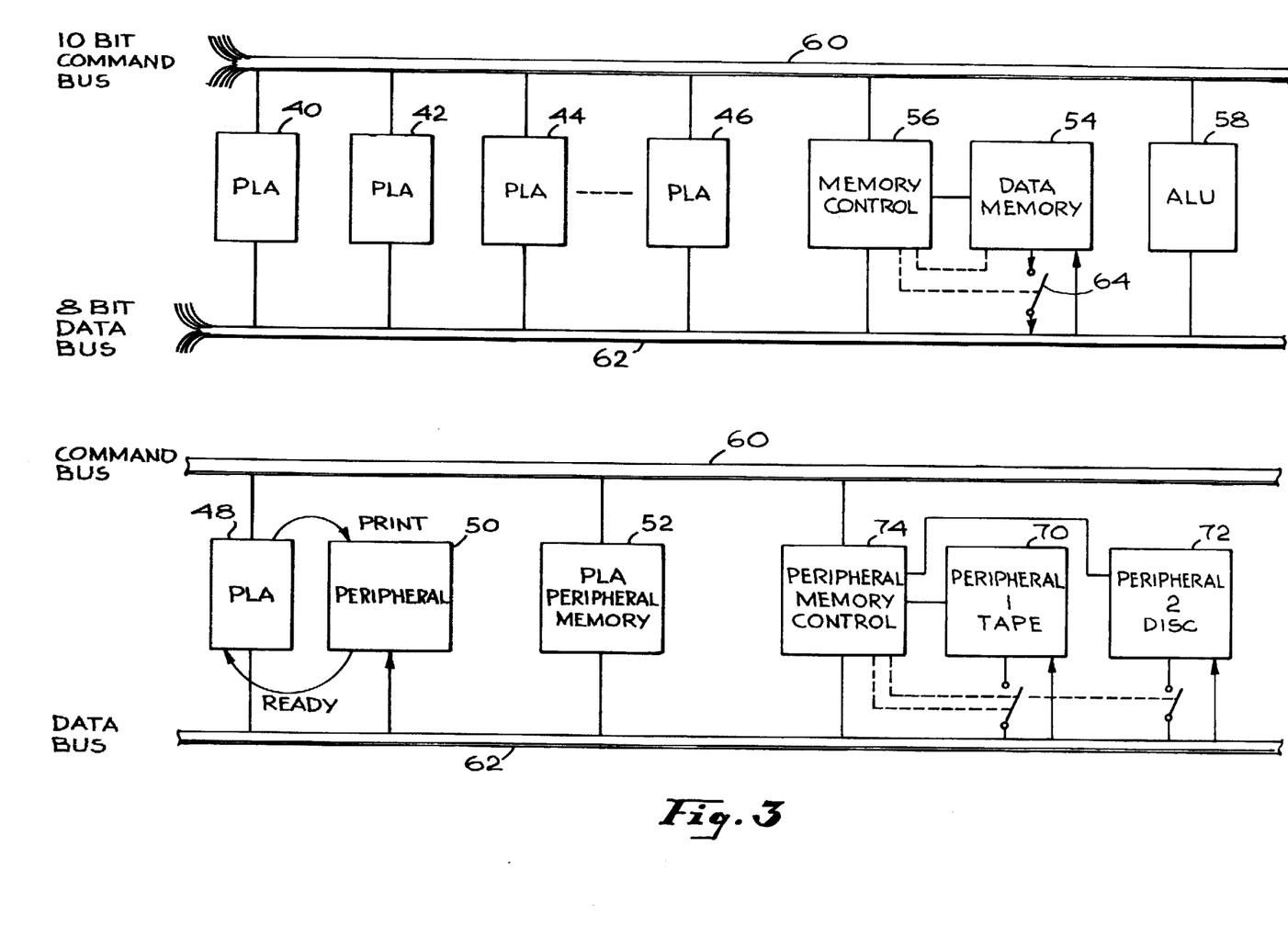
FIG. 3 is a block diagram of an embodiment of this invention.

The organization of a typical data processing system, in accordance with this invention, is shown in FIG. 3. A number of PLA units, respectively 40, 42, 44, 46, 48, 50, 52, by way of example, are provided. The system will include a data memory 54, a memory control 56, and an arithmetic logic unit, 58, by way of example. All of the PLA's are connected to a 10 bit command bus 60, and to an 8 bit data bus 62. These numbers are also exemplary and not to be considered as limiting. The memory control 56, as well as the arithmetic logic control 58 are both also connected to the command bus 60 and the data bus 62. The memory is connected to the data bus.

The logic the PLAs execute is determined by a pattern introduced for example by a photomasking etch technique during its fabrication process and are programmed to carry out programmed sequences. They can branch and loop internally. These PLAs are all basically identical pieces of hardware but only differ from one another by the program that they execute.

The PLA 40 contains the master program. The function of the master PLA, just like the function of the master program 30, shown in FIG. 2, is primarily to call for the performance of sub-routines. The various sub-routines on the various levels are the functions performed by the various PLAs shown in FIG. 3. However, as described previously, there is a restriction that no PLA can perform a sub-routine on more than one level. (In other words, the master program PLA may not contain any sub-routines.) A PLA having a sub-routine on level two may not contain a sub-routine on any other level and may only call subroutines at a lower level than its own. While this convention is more restrictive than necessary, it performs the function of all structured programming--it makes the machine self documenting and modifiable at a later time.

In operation, by way of example, the PLA containing the master program will place a call, consisting of signals, on the command and data buses for the performance of a subroutine, say on level one. The code on command bus is a general call code, while signals on the data bus are indicative of the specific name of the sub-routine it wishes. All of the PLAs receive the command bus and data bus signals, but only the PLA, which contains the sub-routine on the level and with the particular designation indicated by the data bus which has been specified, is programmed to respond.

While that PLA is stepping through or performing the sub-routine which has been activated, all of the other PLAs, including the master, are inactivated, i.e., in a wait state. The activated PLA has entire control of the system and can, by using the command bus and data bus, similarly call upon one of the other PLAs for the performance of a sub-routine at a lower level, in the manner as described in connection with the organization of the program in FIG. 2. The PLA which is activated and is performing its sub-routine, is in command and no other sub-routines are performed until it is finished. When it is finished, it sends a sub-routine finished signal back on the command bus and its own designation (the name which called it) on the data bus to the PLA which called it, which is then activated to finish its sequence, which may include the next PLA called for the performance of another sub-routine in the program, in the manner described.

It is to be noted that no program and no sub-routines are stored in the main data memory 54. These are all contained in the PLAs. The main memory is only used for storing data. Any PLA which is in operation has complete control of the entire machine, which carries out any instruction issued by that PLA. Clearly the master program and other program segments may be stored in a program memory, which may be written as well as read.

The memory control 56 performs the function of containing the memory addresses in registers therein and determining which of these addresses are used for either reading from, or storing data, in memory and in computing new memory addresses. These operations are performed completely independently of any activity on the command or data buses. This is contrasted to the standard processing technique in which roughly 80% of the machine computing time is spend in doing the address calculations.

One of the beneficial and advantageous results of taking the address processing and memory control function away from the CPU is in the number of bits which are required for addressing memory, as contrasted to the number of bits which are required for data. It has been customary to use the same word length for both the memory address work and the data word, even though the number of bits required for addressing memory may be greater or less. The length of the memory address word should be chosen by the amount of memory to be addressed, while the data word length should be set by the precision with which the data must be represented. Therefore, the system shown in FIG. 3 permits the use of the appropriate number of bits required for representing data and the appropriate number of bits required for addressing memory, with the latter being different than the former. For example, in a machine which has been built in accordance with this invention, 8 bits are chosen for the data word length and the arithmetic logic unit 58 is an 8 bit processing unit, while 16 bits are used for memory address. The command bus has 10 bits, chosen for the number of instructions desired.

The memory control 56, besides providing address storage registers and incrementing and decrementing capability, for the memory addresses, determines whether the memory should operate in a read or write mode. A switch 64, is representative of gates and registers required for transferring data, which has been read from memory, onto the data bus. The switch 64 is operated responsive to the memory control. The memory write control enables the memory to enter data on the data bus into a location determined by the address in memory control.

The machine, in its preferred embodiment, has a two phase clocking system and operates in a fully synchronous manner. In the first phase, data commands are sent out on the buses to the various circuits in the computer, such as by the memory control or memory, or ALU, and on phase two, if so ordered, processing of the data occurs, and a result is a ready to be sent in reply during the next phase one. No sequencing has to be reconstructed by any of the apparatus that is more than one cycle long. This means that the system performs in one clock cycle what heretofore has taken many clock cycles to perform. The reason is that all of the control sequencing is under the control of a PLA in charge and not by the CPU. It can be seen that as far as control operations are concerned, the machine does not distinguish "peripheral" units from units internal to the processor. Each is just a functionable block with its own instruction set.

However, the system is set up with some unique options for the control of a certain type of simple peripheral apparatus. Assume that the peripheral apparatus 50 is printing apparatus or tape punch apparatus, by way of example. The PLA 48 contains the sub-routine which controls the entire system after it has received a code on command and a data bus instructing the peripheral apparatus 50 to print or punch. Assume that the printer is of the simple minded type which prints one character at a time or, the tape punch is of the type which punches one code character at a time. When the peripheral apparatus is ready, it issues a ready signal which is applied to the uncommitted input of the PLA 48. In response to the signals on the command and data buses and the ready signal, the PLA orders the memory to read the desired character onto the data bus and during the first machine cycle, when that character is present on the data bus it raises its uncommitted output high, which orders the peripheral apparatus to print a character or punch a character which is applied thereto from the data bus. During this operation, the ready signal is removed. As soon as it is completed, the peripheral apparatus provides another ready signal to the PLA. The PLA, when the next appropriate command signal comes onto the buses, will instruct the peripheral apparatus to intake the next set of data signals and either print or punch them out.

More specifically, how the computer would go about with this printing operation is as follows. At some time during the operation of the machine, it may be desired to print out data which is stored in memory. The master PLA 40, orders a print routine in the form of a sub-routine call which is applied to the command bus and to the data bus. The PLA 48 recognizes the fact that it is being called and then proceeds to perform its subroutine. It first looks for a ready signal from the peripheral apparatus, and then calls on memory to provide the data work to be printed. Upon receiving the ready signal, it instructs the peripheral apparatus to print. After issuing the command, but before the printing process is complete, the computer can perform other operations if desired. The peripheral control PLA may alternatively call out a sequence of data words from the memory to be printed during which time the system is under the control of the PLA 48. A choice of the way of controlling the peripheral apparatus, namely whether to operate one cycle at a time or to hold up the machine until a complete series of operations has been completed, is under the control of the PLA assigned to control the peripheral apparatus. A more detailed description of the manner in which a PLA controls peripheral apparatus is given subsequently herein.

The important point at present, is that for many simple peripherals, the uncommitted input and output wire or wires on the PLA actually containing the control program for the system during the peripheral control period provide a very powerful direct interface from the operating "software" in the machine to the device being controlled.

This system readily lends itself to performing interrupts and has the capability of essentially "direct memory process" under full program control, for the purpose, for example, of either receiving data from peripheral memory or transferring data to peripheral memory.

The way in which rapid data transfers between the main memory of the system and some peripheral or peripheral memory are accomplished is as follows. Let us take, for example, one peripheral memory system 70 as a tape system and the other peripheral system 72 as a disc system. Both systems contain buffers of considerable size so that they can accept data synchronously with the system until their buffers are full.

Assume the case where it is desired to dump a section of main memory into a peripheral buffer as fast as possible. In this case, the peripheral memory system controller (which probably is another PLA such as 74) is issued a ready signal by the system control PLA. Subsequently, the system control PLA is locked into a one instruction loop sending read and increment commands to the main memory control chip. Hence, in each machine cycle the main memory reads contents of it's currently addressed location onto the data bus and the address of the memory is incremented by the contents of the increment register. Concurrently, upon receipt of the read and increment instruction, the peripheral memory control PLA clocks the contents of the data bus into it's buffer memory.

The entire operation proceeds at 1 word of data per machine cycle until the buffer memory is full, at which time the peripheral memory controller will signal the system control PLA that it should stop. This may be done in a number of ways. The simplest being to raise the single uncommitted input into the system control PLA containing the segment of code controlling this memory operation and thereby signaling it that it should no longer send data until the peripheral memory system has had a chance to digest what has already been sent. Note that no machine cycles are necessary to include such a branch instruction in the program controlling the system during this equivalent of direct memory access operation. Yet at all times the operation is completely and synchronously under program control.

The arithmetic logic unit 58 is a reasonably conventional ALU which takes in data from the data bus, in response to instructions over the command bus, processes it and then returns it to the data bus.

Figure 4:
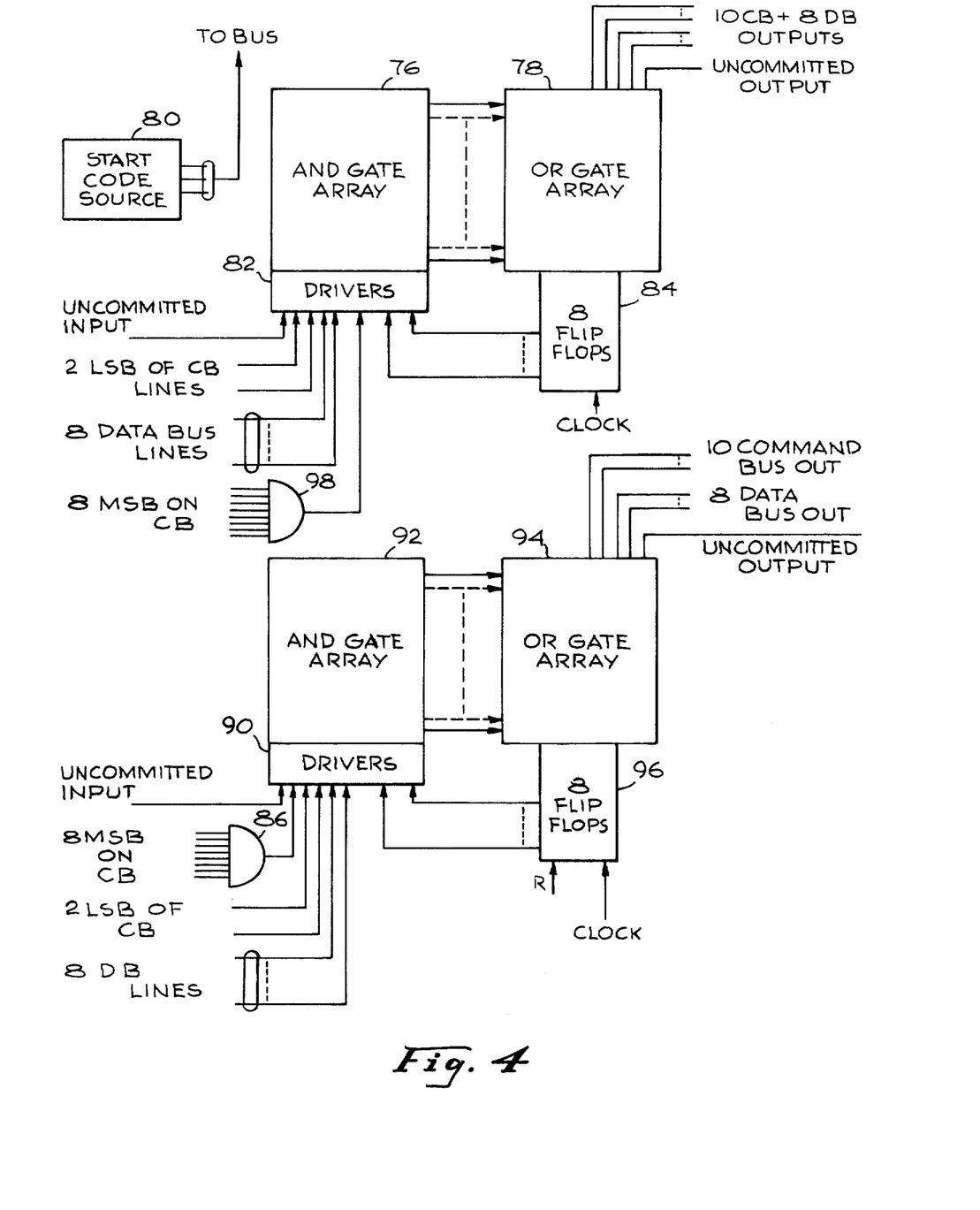
FIG. 4 is a block diagram illustrating PLA input and output arrangements in accordance with this invention.

FIG. 4 is a block schematic diagram which is shown for the purpose of indicating the inputs and outputs of a program PLA and of a sub-routine PLA. As indicated in FIG. 1, both PLAs are identical (except for the programs contained therein) and contain an AND gate array 76 which provides an output to the OR gate array 78. A start code source 80, which can be a source of signals calling out the program to be run, applies its output via the command bus to some of the drive amplifiers in the drive amplifier circuits 82, which drive the gates in the AND gate array. This input starts off a desired program. Some of the AND gates in the array, in response to the signals instructing the program to be run, apply their outputs to the OR gates in the OR gate array. When a sub-routine is called, outputs are applied by the OR gate array, to the ten command bus lines and eight data bus lines. The OR gate array also applies signals to the flip flops (there are usually eight) 84, which feed back their output to the drivers which drive the AND gate array.

The code for selecting any sub-routine PLA is one specific combination of signals on the most significant 8 bits of the command bus and a code specifying the particular sub-routine on the data bus. The lines in the command bus carrying the eight most significant digits are applied to an eight input AND gate 86, which is provided for every PLA in the system to recognize sub-routine calls and returns or more properly, transfer of control from one PLA to another. In this sub-routine call, the output of the AND gate is decoded in the PLA which has been called, along with the specific 8 bit identity on the data bus and sets a code in the flip flops 88. Four particular types of transfer commands can be recognized, for which a call is provided, as indicated by the two least significant bits of the command bus, which are applied to the drivers 90, of the gate array 92, of the sub-routine PLA. The calling PLA goes into a wait state. The specific sub-routine which is to be performed is specified by the signals on the eight data bit lines, which are also connected to the drivers 90 of the sub-routine AND gate array 92. The subroutine PLA which has been selected, in response to the signal from the AND gate 86, the two least significant bit command bus signals, and eight data bus signals, then commences functioning, providing outputs to the associated OR gate array 94 which in response thereto applies outputs to the command bus for instructing the system, and can provide outputs to the data bus, and also applies outputs to its machine state flip flops 96, for circulation back into the AND arrays. The sub-routine PLA can also execute loop and branch operations, if required, sequencing through the appropriate machine state for executing loop and branch routines and can branch on any condition on the data bus, since all data bus lines are inputs to the AND plane. This can all be programmed into the sub-routine PLA, if desired.

The sub-routine PLA, at some point, can call for one of the lower level sub-routines to commence operation by putting out a sub-routine PLA call on its command and data bus outputs. If a particular program requires more instructions than can be stored on a single PLA, the PLAs have lines extending to their AND gate inputs, which are indicated in the drawing as uncommitted input, and have lines extending from their OR plane outputs indicated as uncommitted outputs. The PLA can have programmed therein that it should activate another PLA with further instructions, by providing an output on the uncommitted output line to the succeeding PLA which can then, in response thereto commence operation. The system is very flexible in this regard.

When a sub-routine has given all the instructions required for executing a particular sub-routine, it provides an output which comprises the same signal set on the most significant 8 bits of the command bus and all bits of the data bus by which it was selected. This signal set is recognized by the program PLA whereby it goes from its wait state on, through the program it controls, for example, making the next sub-routine selection for a particular program. The two least significant bit command bus lines and the eight data bus lines are also connected to the drivers 82 of the program PLA. An AND gate 98 has connected thereto the 8 most significant bit lines of the command bus (or their complements, as desired) to decode the signals referred to above. The output of the AND gate 98 is applied to one of the drivers which drive the AND gate array 76. The AND gate array 76 decodes the returned command bus and data bus signals and in the presence of the signal from the AND gate then can generate the subsequent sequence of command and data signals for controlling the system, including possibly selecting the next PLA sub-routine.

The arrangement just described indicates how the present system can be used with a program having any number of levels of sub-routines and at the end of the sub-routine, can promptly issue the next instruction. Thereby, the presently known systems, wherein at the end of a sub-routine stored signals are called out of memory and processed for the purpose of calling out the next sub-routine and then sent back to memory, for storage, with its attendant delays and inefficient use of memory for program storage instead of data storage, is eliminated. This system effectively keeps track of its own status, and monitoring by a separate CPU is not required.

Figure 5:
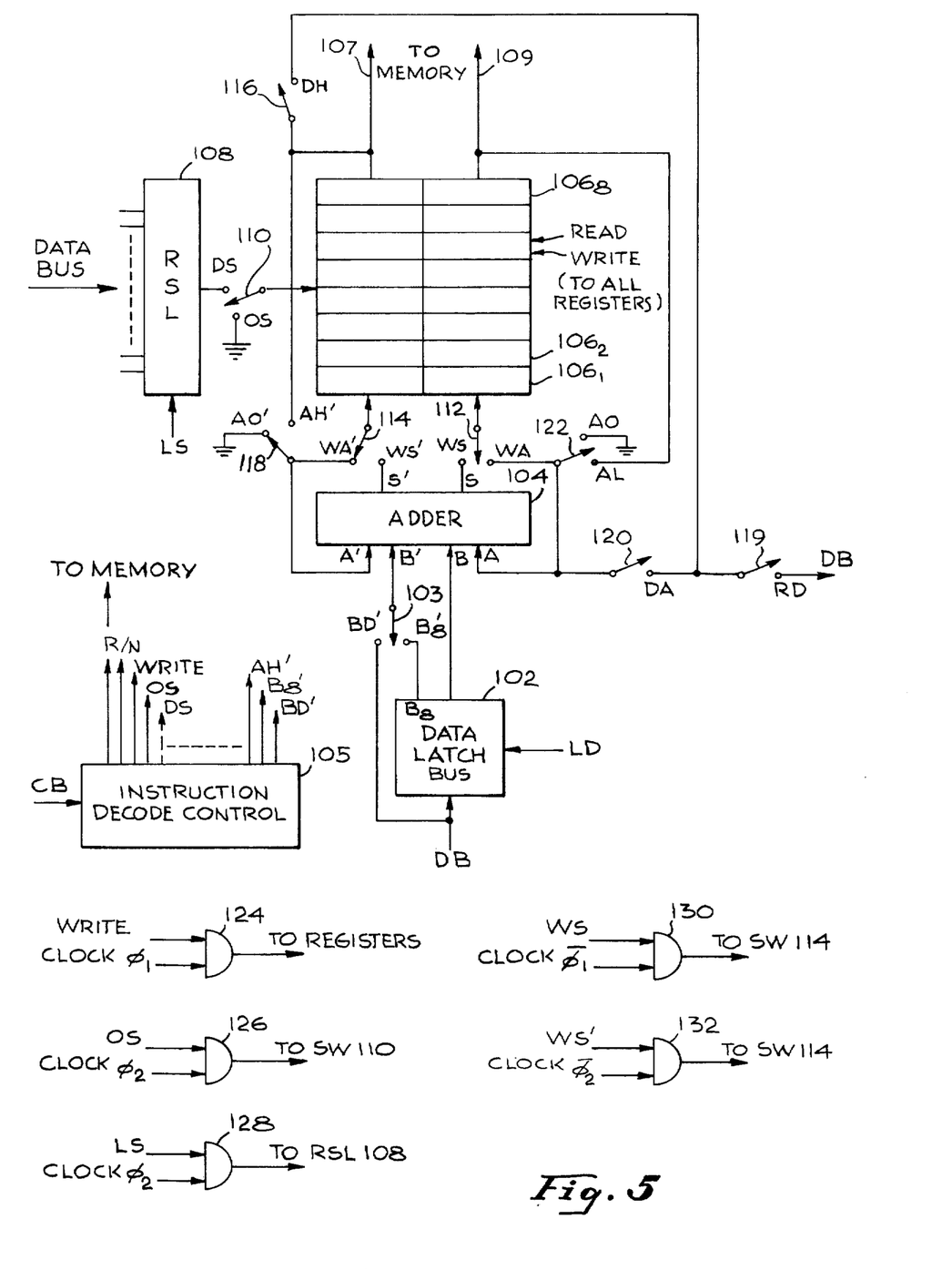
FIG. 5 is a block diagram of a memory control circuit arrangement in accordance with this invention.

FIG. 5 is a schematic drawing of a memory control chip 56, suitable for use with this invention. It includes a data bus latch 102 which is a register, which, in response to an LD signal is enabled to have transferred thereinto data on the data bus at that time. The data bus latch has its output connected as the 8 inputs to the 8 least significant bits of a 16-bit parallel adder. The adder is shown as being divided into low order 8-bits and high order 8-bits.

It should be noted that the switches which are shown in this diagram are, for example, MOS switches, which may be closed in response to instructions or signals received from an instruction decode control circuit arrangement 105. The instruction decode control circuit receives instructions from the command bus, in response to which it energizes one or more of its output lines, which has the same nomenclature as the switch contact terminal to which the switch is ordered closed. When one of these lines goes high, the switch to which it is connected is closed on the indicated contact. Otherwise, the switches are in their normally open condition.

The data bus latch 102 has a line with the designation B, going directly to the low order 8-bits to transfer any low order 8-bits received into the adder. The single pole double throw switch 103 can be ordered to close on contact B8', which transfers the highest order (sign) bit in the data bus latch to all 8 high order inputs to the adder, designated as B'. When switch 103 is closed on contact BD' there is a direct entry from the data bus into the B' input to the adder. The adder input designated as A and the adder input designated as A' are respectively input to the low and high order 8-bit inputs of the adder 104. Their connections will be subsequently described.

There is provided also, eight registers respectively $106_1$ through $106_8$. Each one of these registers can be loaded with a 16-bit number in response to a "write" signal. A register select latch 108, to which the data bus is connected, selects the register into which data is to be written in the case of a write and whose output will be connected to the 16 memory address wires 107 and 109. An LS signal applied to the register select latch enables the register select latch to receive the register selection number on the data bus. A one out of 8 code is placed on the data bus. The location of the bus line containing a "ONE" corresponds to the location of the register desired to be selected. Thus, a one on the least significant bit of the data bus entered into the register selection latch will enable the entry of data from the adder 104 into register $106_1$ when the switch 110 connects to the DS terminal and a write signal is applied. The selected register has access to the memory address output wires 107, 109 through drivers (not shown). The circuit arrangement for performing the addressing of a memory from the contents of a register is well known and therefore need not be described here.

Output from the low order 8 bit section of the adder is entered into whichever one of the eight registers is selected (if a write signal is applied thereto at the time) through a single pole double throw switch 112. The switch has a contact labeled WS. The current contents of the selected register can also be fed back to its input through WA. The contact to which the switch is closed is determined by the instruction out of the instruction decode control 105.

Similarly, the high order 8-bit outputs on the adder 104 are transferred to the 8-bit section of the selected register (if a write signal is applied) over a contact WS' of a double pole double throw switch 114. The switch contacts are labeled WA' and WS'. The most significant 8-bits of the current contents of the register can be fed back to its inputs through contact WA'. The one of these to which the switch is operated is determined by the instruction decode control 106.

The high order 8-bit output from all of the registers, which connects to the memory, also connects to two switches. One of these, 116, is an 8 pole, single throw switch with a contact labeled DH. The other, 118, is an 8 pole double throw switch with contacts labeled AO' and AH'. AO' is connected to ground. The DH terminal of switch 116 is connected to a DA terminal and also to a switch 119, which is an 8 pole single throw switch and has its contact labeled RD. The RD terminal connects to the data bus. It will be understood, that the switches which either feed 8-bits into the registers or carry 8-bits out of the registers are all eight contact wide and the single lines in the drawing represent eight lines. Thus the switch 116 which is connected to the output of the high order section of the selected register, actually comprises eight switches connected to each of the high 8-bit stages of the registers. Switch 116 also connects to the AH' terminal of switch 118.

An 8 pole single throw switch 120, has a contact labeled DA which is connected to the contact labeled DH, and is also connected to the switch 119. Switch 120 connects to the A input terminal (8 terminals actually) which is the low order 8-bit input to the adder 104. Switch 118 connects to an A' terminal (8-bit input terminal) which represents the 8-bit high order inputs to the adder 104. The A' B' inputs as well as the A B inputs are parallel inputs. They are shown in the drawing as separate inputs for the purpose of ease of explanation.

An 8 pole double throw switch 122 connects to the WA terminal of switch 112 and also to the A input of the adder 104. It has contacts designated as AO, which is connected to ground, and AL, which is connected to the low 8-bit outputs of the registers $106_1$ through $106_8$.

The write signal received from the instruction decode control 105 is applied to the registers $106_1$ through $106_8$ upon the occurrence of the phase 1 clock signal. This is achieved by applying the write and clock phase one signal to an AND gate 124, whose output is the write signal applied to the registers. Switch 110 is operated to close the OS contact in response to the output on an AND gate 126. Input to this AND gate is the OS output of the instruction decode control 105 and the phase 2 clock signal. The DS output signal of the decode control causes switch 110 to close a DS contact.

The register select latch 108 is enabled in response to an LS signal output of the instruction decode control and a phase 2 clock signal. These are applied to an AND gate 128, whose output constitutes the LS signal applied to the register select latch 108.

Switch 114 is caused to close the WS contact in response to the output of an AND gate 130. The inputs to this AND gate are the WS output signal of the instruction decode control and the phase 1 clock signal. Switch 114 is caused to close the WS' contact in response to the output of an AND gate 132. The inputs to this AND gate are the WS' signal output of the instruction decode control and the phase 2 clock signal.

Table 1, shown below, illustrates all of the operations of which the memory control chip is capable. The switch contact or symbol signals are shown at the bottom of the columns drawn on the table and correspond to those shown on the drawing. A "1" in a column indicates that the signal is present, in the case of signals (such as "write"), or to indicate that a switch is closed to the designated contact. A zero indicates that it is inoperative. The clock phase, where required, is shown below the switch symbols. To the right of the column is shown the actual operation that occurs in abbreviated form. An interpretation of the abbreviations which are used, is shown below the abbreviations of the operations. The numbers shown in the table therefore represent the outputs from the instruction decode control 105 in response to the signals applied thereto by the command bus. The instruction decode control is simply an array of gates which responds to the signals on the command bus to provide outputs as shown. Its structure is readily understood by those skilled in the art.

tered into the register again on the next cycle. At the same time the increment from the data bus is left in the data bus latch. On the same line as the abbreviation just noted there is a 1 in the extreme left column so that when the clock phase 1 occurs the write signal is applied to all of the registers, thereby writing the outputs of the adder into the selected register. There is a 0 in the OS column meaning that switch 110 will not be connected to the OS contact to ground. There is a 1 in the DS column whereby when clock phase 2 occurs switch 110 is closed to the DS contact. LS is low because there is a 0 in that column and hence a new register is not selected. There is a 1 in the LD column indicating that the number on the data bus will be entered into the data bus latch.

The next 1 is found in the AH' column indicating that switch 118 will connect to AH' terminal. The next 1 is found in the WS' column at phase 1 indicating that at clock phase 1 switch 114 will connect the registers to the high order 8-bit output of the adder. The B8' column has a 1 indicative of the fact that switch 103 will close to the B8' terminal and the one highest order

TABLE 1

| SELECT | 0 | 1 | 0 | 1 | | | | | | 0 | | | |
|---|---|---|---|---|---|---|---|---|---|---|---|---|---|
| LLZ | 1 | 0 | 1 | 0 | 1 | 0 | 0 | 1 | | 1 | 1 | 0 | 1 |
| LLL | 1 | 0 | 1 | 0 | 1 | 0 | 0 | 1 | | 1 | 0 | 1 | 1 |
| LHZ | 1 | 0 | 1 | 0 | 1 | 0 | 1 | 0 | | 0 | 1 | 0 | 0 |
| LHL | 1 | 0 | 1 | 0 | 0 | 1 | 1 | 0 | | 0 | 1 | 0 | 0 |
| | 0 | 0 | 1 | 0 | 0 | 1 | | | 1 | 0 | 0 | | |
| | 0 | 0 | 1 | 0 | | | | | 0 | 1 | 0 | | |
| KFR | 1 | 0 | 1 | 1 | 0 | 1 | 1 | 0 | | 0 | 0 | 1 | 1 |
| INC | 1 | 0 | 1 | 0 | 0 | 1 | 0 | 1 | | 1 | 0 | 1 | 0 |
| LATCH | 0 | 0 | 1 | 0 | | | | | | 1 | | | |
| RD/INC | 1 | 0 | 1 | 0 | 0 | 1 | 0 | 1 | | 0 | 0 | 1 | 0 |
| RD | 0 | 0 | 1 | 0 | | | | | | 0 | | | |
| RD/INC/LTCH | 1 | 0 | 1 | 0 | 0 | 1 | 0 | 1 | | 1 | 0 | 1 | 0 |
| | 0 | 1 | 0 | 1 | | | | | | 0 | | | |
| WRITE | 0 | 0 | 1 | 0 | | | | | | 0 | | | |
| WRITE/INC | 1 | 0 | 1 | 0 | 0 | 1 | 0 | 1 | | 0 | 0 | 1 | 0 |
| | WRITE | O | D | L | A | $A_l$ | WA | WS | DA | DH | LD | $A_o'$ | AH' | WA' |
| | | S | S | S | | | | | | | | | | |
| | $\phi_1$ | $\phi_2$ | $\overline{\phi_2}$ | $\phi_2$ | | $\overline{\phi_1}$ | | | | | | | | |

| | | | | |
|---|---|---|---|---|
| SELECT | | | | DB → RSL |
| LLZ | 0 | 0 | 0 | DB → LO REG  0 → HI REG  DB → DBL |
| LLL | 0 | 0 | 0 | DB → LO REG  DB → DBL |
| LHZ | 1 | 0 | 1 | DB → HI REG  0 → LO REG |
| LHL | 1 | 0 | 1 | DB → HI REG |
| | | | | LO REG → DB |
| | | | | HI REG → DB |
| KFR | 0 | | | REG → REG' (SELECTED BY DATA BUS) |
| INC | 1 | 1 | 0 | REG + DB → REG  DB → DBL |
| LATCH | | | | DB → DBL |
| RD/INC | 1 | 1 | 0 | MEM → DB  REG + DBL → REG |
| RD | | | | MEM → DB |
| RD/INC/LTCH | 1 | 1 | 0 | MEM → DB  REG + DB → REG  DB → BL |
| | | | | MEM → DB  DB → RSL |
| WRITE | | | | DB → MEM |
| WRITE/INC | 1 | 1 | 0 | DB → MEM  REG + DGL → REG |
| | WS' | $B_x'$ | $B_u'$ | RSL = REGISTER SELECT LATCH |
| | | | | DBL = DATA BUS LATCH |
| | | | | MEM = CURRENTLY ADDRESSED MEM LOCATION |
| | $\overline{\phi_1}$ | | | REG = CURRENTLY SELECTED ADDRESS REGISTER |
| | | | | HI & LO REFER TO HI ORDER OR LOW ORDER |
| | | | | 8 BITS OF MEM ADDRESS REGISTER |

For the purpose of illustrating how this table can be used, assume it is desired to increment an address in a register. The register whose address is to be incremented is selected by the one out of 8 code placed in the register select latch previously in response to a command and data input signal. The amount of the increment is indicated by signals received by the data bus latch from the data bus. The increment operation is indicated in abbreviated form by REG+DB → REG, DB → DBL. This indicates that the current register contents plus the number on the data bus is then en- (sign) bit of the data bus latch will be converted to all 8 B' inputs of the adder. This allows positive or negative numbers to be used as increments. Note switch 122 is closed to the AL terminal. Switch 112 is closed to the WS terminal to load the low order 8-bits from the output of the adder into the register at phase 1 clock time.

With the switches closed as described, what happens is that the data bus latch receives the increment which is to be added to the contents of the register which will be selected in response to the LD signal. This is transferred into the two adder inputs B' and B. Contents of the selected register are entered into the adder to be added to the data bus latch input. The low order register bits are entered into the register over the output line through switch 122 and the A input. The high order register bits are entered over the high order output line through switch 118 into the A' input of the adder. The respective low order and high order adder outputs are entered into the selected register in place of the number presently in the selected register, through the respective switches 112 and 114 and in the presence of a write signal.

For the purpose of further explanation, assume now that it is desired to transfer information which is on the data bus into a selected register. Since the data bus in only 8-bits wide, if these are the low 8-bits then the data bus output will go into the low register. The abbreviations indicative of this operation are on the second row of the table.

It will be seen that there is a 1 in the write column, a 1 in the DS column, a 1 in the AO column, a 1 in the WS column and a 1 is in the respective LO, AO' and WA' columns. The effect of these is as follows. The 1 in the DS column closes the switch 110 so that the register select latch can select a register into which the data on the data bus will be written. The write signal is high. Thhe 1 in the AO column causes the switch 122 to be closed to the AO terminal. The 1 in the WS column closes switch 112 on the WS terminal.

The 1 in the LD column enables the data bus signal to be entered into the data bus latch. The 1 in the AO' column closes switch 118 on AO' terminal. The 1 in the WA' column closes switch 114 on WA' terminal.

Now what has occurred in response to the foregoing signals is that the low order 8-bits entered into the data bus latch from the data bus, are directly entered into the adder over input B. Since nothing else is added to this, the output of the adder is a repetition of its input. This output is entered over switch 112 into whichever one of the registers that has been selected by the contents of the register select latch through switch 110. The high order 8-bits of the selected register have a 0 entered into them by way of the ground contact AO' over switch 114, which is connected to the WA' terminal.

From the foregoing, it should be clear how the memory control chip responds to the instructions of the command bus. The first two outputs of the instruction decode control determine whether the memory will read out information from the address contained in the register 106 selected by the register select latch 108 (Mem → DB), or will have data written into it at the location of the address in the register selected by the register select latch (DB → Mem). Information to be written into the memory is present on the data bus and merely awaits the application of the address to the memory indicative of where the information on the data bus is to go.

In order to illustrate how the PLAs operate in a system such as has been described herein, Table 2, shown below, represents a sequence of operations which can occur, for example, when it is desired to display a particular portion of the contents in memory on a display device, such as a cathode ray tube, and, when the memory produces cursor representative signals, it is then desired to punch a character on tape, using a tape punch apparatus. Thereafter, it is desired to go back to the display operation until a certain location in memory is reached, such as the end of a page.

TABLE 2

| LINE | SPECIAL INPUTS | COMMAND BUS INPUT | DATA BUS INPUT | CURRENT MACHINE STATE | COMMAND BUS OUTPUT | DATA BUS OUTPUT | NEW MACHINE STATE | SPECIAL OUTPUTS | COMMENTS |
|---|---|---|---|---|---|---|---|---|---|
|   |   | PLA 1 |   |   |   |   |   |   |   |
| 1 |   | NO CURSOR |   | 0001 | RD/INC |   | 0001 | 1 | TO DISPLAY |
| 2 |   | CURSOR |   | 0001 | LATCH | −1 | 1010 |   |   |
| 3 |   |   |   | 1010 | INC |   | 0010 |   |   |
| 4 |   |   |   | 0010 | RD/INC |   | 0011 |   |   |
| 5 |   |   |   | 0011 | WRITE |   | 0100 |   |   |
| 6 |   |   |   | 0100 | LATCH | +1 | 0110 |   |   |
| 7 |   |   |   | 0110 | CALL | 1101 | 0111 |   |   |
| 8 |   | CALL | 1101 | 0111 | WRITE | CURSOR CODE | 0001 |   |   |
| 9 |   | END OF PAGE |   | 0001 | WRITE MEM ADDRESS | 0000 | 1000 |   | WAIT FOR FLYBACK |
| 10 | FLYBACK |   | 1000 |   |   |   | 1001 |   |   |
| 11 | 0 |   | 1001 |   |   |   | 0001 |   |   |
|   | READY | PLA 2 |   |   |   |   |   | PUNCH |   |
| 1 |   | CALL | 1101 | 0000 |   |   | 0001 |   |   |
| 2 | 1 |   |   | 0001 | RD/INC |   | 0010 |   |   |
| 3 |   |   |   | 0010 |   |   | 0011 | 1 | PUNCH |
| 4 |   |   |   | 0011 | CALL | 1101 | 0000 |   |   |
| 5 | 0 |   |   | 0001 | INC |   | 0011 |   | NOT READY |

The instructions shown in the table can be readily implemented, by those skilled in the art, in the form of a mask which can be used on a PLA for the purpose of forming it into a logic performing read only memory device which is sequenced to issue instruction and to recognize inputs for generating further instructions or for calling on a sub-routine PLA which is on a lower sub-routine level.

The heavy line down the center of the table divides PLA 1 and PLA 2 into the input side, (AND gate array), and the output side, (OR gate array). The columns on the input side are respectively headed "Special Inputs," command bus input, data bus input, and "Current Machine State." The headings on the columns on the output side are respectively "Command Bus Output," "Data Bus Output," "New Machine State," and "Special Outputs." The column headed "Comments" is for the purpose of explanation on what occurs and is not part of the PLAs. The "New Machine Status Output" is an input to the flip flops which is entered into the "Current Machine Status" column on the next clock cycle via the flip flops. It is believed that from the description that follows, the sequence of operations of the PLAs for the purposes of this invention will be made clear.

For the purpose of displaying the contents of the memory 54 on a display device, it is necessary to read an address at a specified location in memory and then to increment that address. The memory control chip 56, in response to the proper instructions, can as a single instruction cause an addressed location in memory to be read and also can increment that address. Assume that PLA 1 has been called upon by the Master Program PLA, in the manner previously described, to start issuing instructions for the purposes indicated. Assume that when called upon to do so, PLA 1 flip flops provide output signals representative of 0001 to the AND gate plane. These signals can be said to represent the current machine status and cause certain inputs to the OR gate plane which in turn generates outputs to the command bus when line 1 of PLA 1 alone is activated, it instructs the memory control te read from the memory and to increment the address thereafter. Since it is desired to repeat the read and increment cycle until such time as a cursor symbol is read out of memory, the OR gate plane repeats the current machine state signals, 0001, in the new machine state column and provides these as outputs to the flip flops which will then send them back into the AND gate plane.

The PLA 1, in addition to providing the signals just described, also provides an output designated as special output, which can be a signal on the uncommitted output of the PLA. This uncommitted output of the PLA connects to a control input of the specified display device in the manner described in connection with FIG. 3.

PLA 1 will continue to issue the command for the performance of read and increment and display until such time as a cursor signal is issued from memory. The cursor signal, which is on the data bus input, together with the machine status symbolized by 0001 activates line 2 of PLA 1 and causes the AND gate array to provide output signals to the OR gate array, which result in an instruction to the memory control chip to latch a "−2" signal, which is provided on the data bus. A new machine state is also generated and it is represented by the signals 1010, which are applied to the feedback flip flops to be fed back into the AND plane. In line 3 the 1010 state is recognized when the memory address is the second location past the cursor and causes the address to be decremented by 1 and 0010 to be fed into the flip flops.

The 0010 machine status signals are recognized by the AND plane line 4 and converted into a read increment signal whereby the data stored in a location in the memory in the location after the location of the cursor, is read out and the memory address is decremented by 1, as a result of which the address in the memory control chip is now the cursor address. It is now desired to write the data read out of memory back into memory at the cursor location. The 0010 AND plane signal, besides causing the command bus "read-increment" signal also causes the OR plane to generate a new machine state set of signals represented by 0011 and issue a write command signal. The signal new machine state is fed back through the feedback flip flops which store these signals as 0011 into the AND plane, and provide lines output to the OR plane which is converted by the OR plane into write command signals and a new machine status signal 0100. The write command signals cause the memory control circuits to write into the location in memory represented by the cursor address, the data previously stored in the location succeeding the cursor address.

The machine state 0100 is circulated back into the AND plane and the AND plane output to the OR plane causes it to generate a latch signal on the command bus and a "+1" signal on the data bus whereby the memory control circuit will store +1 for the purpose of adding it to the current memory address.

It should be noted that the new machine state is 0110. This machine state indicates that it is time to perform a sub-routine call operation during which a call will be placed to a lower order sub-routine PLA (PLA 2) for the purpose of activating a tape punch. Thus, the OR plane is response to the 0110 output of the AND plane (line 7) places a sub-routine call signal of the type described in connection with FIG. 4 on the command bus and signals, the particular sub-routine being indicated by 1101 on the data bus, which selects the particular sub-routine desired. At that time also, the new state of the machine is represented by signal 0111. PLA 1 at this time will stop sequencing and control of the system is taken over by PLA 2. PLA 2 has entered thereinto the call signals from the command bus and the data bus.

It is assumed that the current machine status signals in PLA 2, represented by the output of the AND gate plane to the OR gate plane are represented by 0000. The call on the command bus together with the 1101 on the data bus causes the AND plane to activate lines which cause the OR gate plane to generate a set of new machine status signals. These are represented here by 0001. These signals will here be referred to as PLA 2, line 1 signals. The tape punch apparatus, if ready to operate, provides a 1 signal to the special input section of the PLA 2 AND plane. This ready signal together with the PLA 2 "0001" machine state causes line 2 to become active and the OR plane to output read and increment signals on the command bus and to indicate a new machine state represented by PLA 2, "0010" signals.

The memory control chip reads the information stored at the address location which it also has stored, which happens to be the address of the cursor in which writing has just taken place. This address is incremented by the +1 which was stored in the latch on the memory control chip. Machine state PLA 2 0010 is fed back to the PLA AND plane, in response to which the OR plane registers a machine state PLA 0011 and outputs an instruction to the punch tape apparatus to punch the data read from memory. The PLA 2 0011 signal is then fed back to the PLA 2 OR plane, in response to which PLA 2 puts out a sub-routine return signal on the command bus and 1101 on the data bus. It also goes back to its 000 machine state. The sub-routine return signals and the 1101 on the data bus is recognized by PLA 1 and is entered into its AND plane resulting in a new machine state signal 0001. Simultaneously the PLA 1 OR plane produces a set of write command signals on the command bus and cursor code signals on the data bus, which are written into the new address location in memory. This is the location following the previous cursor location. The machine state reverts back to the 0001 state and will continue reading and incrementing and displaying until such time as there is received an "end of page" signal over the command bus. This is a signal which the memory puts out when it comes to the end of a particular storage area.

Since it is desired to continue displaying the contents of memory for the specified storage area of memory, when the end of the storage area is reached, as indicated by the end of page signal, the AND plane generates signals on the command bus indicating to the memory control chip to write a new address for the read out from memory. This is represented on the data bus by 0000 signals. The new machine state is represented by 1000.

According to the instructions which may be stored, this operation may terminate at this time in which event the PLA 1 will put out a call back to the main program PLA, or may commence reading the data stored in memory to be displayed again, depending upon what the instruction stored in the PLA specifies.

Two further situations have to be considered at this point. One of them is what happens when PLA 2 receives a not ready signal from the tape punch at the time that it receives a call from PLA 1. This is represented by a 0 in the special input column. A 0 in the special input column plus 0001 in PLA 2's current machine state column will cause line 5 to become active rather than line 2, resulting in an "increment" instruction signal to be applied to the command bus and a new machine status representing 0011 to be generated by the OR plane. In response to the 0011 input to the AND plane, the PLA 2 OR plane generates the return and data bus signals instructing PLA 1 to take over again exactly as before. PLA 1 will then operate in the manner described, as if the tape punch had operated, except no read of memory and no punch operation has occurred.

Since a cathode ray display device has a fly back interval, in order not to lose data which would not be displayed during the fly back interval, it is necessary to halt memory display for that interval. This can be programmed into the PLA 1. The display device will generate a flyback start signal which is entered into the PLA 1 special input. This, together with the 0001 signal in the PLA AND plane, generates a new machine state 1001 signal at the OR plane output. No command bus instructions or data bus signals are provided during the period when the PLA is in the 1001 state. The memory control circuit will not operate until it is instructed to move forward by signals from the command bus. Upon receiving a flyback end signal (represented by 0 on the special input to the AND gate which indicates that the cathode ray display device is now at the end of its fly back interval) that signal, together with the current machine state signal 1001, causes line 11 to become activated which in turn causes the regeneration of the 0001 machine state signals whereby the memory can commence being read and provide signals to the display device for display.

From the foregoing, it will be seen that there has been described a novel and improved arrangement for a data processing system.

The embodiments of the invention in which an exclusive property or privilege is claimed are defined as follows:

1. In a data processing system, having main memory means and data processing means, a separate system for ordering said processing system to perform data processing comprising
    planned logic array (PLA) means for storing instructions required for ordering data processing by said main memory means and said data processing means,
    a master planned logic array (PLA) means for storing codes specifying sequences of instructions in said planned logic array means for performing desired data processing operations,
    means for successively reading out said codes stored in said master planned logic array means and applying them to said planned logic array means,
    means, in said planned logic array means responsive to a code from said master planned logic array means, to read a sequence of instruction signals stored therein to said data processing means to instruct it how to process data, and
    means in said planned logic array means responsive to the end of said sequence of instruction signals to signal said master planned logic array means to provide a code for ordering the next sequence of instructions.

2. A data processing system as recited in claim 1 wherein said planned logic array means constitutes a plurality of planned logic arrays, each of which arrays responds to a different code,
    predetermined ones of said planned logic arrays including means for generating a code specifying a sequence of instructions in another one of said planned logic arrays while partly through its own sequence of instructions,
    means in said another one of said planned logic arrays responsive to its code for producing a sequence of instructions followed by the code to which it responded, and
    means in the predetermined one of said planned logic arrays which called said another one of said planned logic arrays responsive to the code produced by said predetermined one of said planned logic arrays to continue with the read out of its sequence of instructions.

3. A data processing system as recited in claim 1 wherein said means in said planned logic array means to signal said master planned logic array means to provide the code specifying the next sequence of instruction signals includes
    means to generate code signals which are the same as the code in response to which the sequence of instruction signals just completed was initiated in said planned logic array means, and
    means to transmit said generated code signals to said master memory means at the end of a sequence of instruction signals.

4. A data processing system as recited in claim 1 wherein there is included peripheral apparatus,
    said planned logic array means stores a particular sequence of instructions required for operation of said peripheral apparatus which can be specified by a particular code, and
    said master planned logic array means stores said particular code.

5. In a data processing system as recited in claim 1 wherein there are included a data bus for carrying data and
    a command bus for carrying commands, said data bus and command bus interconnect said
master planned logic array means, said planned
logic array means and said main memory and said
data processing means, and said code signals in-
clude command signals for selecting a planned
logic array means and data signals for selecting a
sequence of instruction signals.

6. In a data processing system having command bus
means, data bus means, main memory means and main
data processing means, a separate system for ordering
said data processing system to perform data processing
comprising
 a plurality of separate routine planned logic array
  means, each of which has inputs and outputs,
 each of said separate routine planned logic array
  means includes means responsive to specific code
  signals at its inputs to generate a sequence of in-
  structions commanding said data processing system
  to perform specific data processing operations, and
 means responsive to a signal signifying the end of said
  sequence of instructions to generate code signals,
 a program memory means having inputs and outputs,
  and including means for sequentially generating
  code signals to initiate operation of selected ones
  of said separate routine planned logic arrays re-
  sponsive thereto,
 said program memory means including means re-
  sponsive to receiving code signals at its inputs
  which are the same signals as the code signals just
  previously generated by it for generating the next
  set of code signals in a sequence,
 means connecting the command bus means of said
  data processing means, to some of the outputs and
  inputs of all of said separate routine planned logic
  array means and program memory means for carry-
  ing command signals therebetween, and
 means connecting the data bus means of said data
  processing system to others of the outputs and
  inputs of all of said routine planned logic array
  means and program memory means for carrying
  data therebetween.

7. In a data processing system as recited in claim 6
wherein predetermined ones of said separate routine
planned logic arrays include means for generating a
code specifying a sequence of instructions in another
one of said separate routine planned logic arrays while
partly through its own instructions,
 means in said another one of said separate routine
  planned logic arrays responsive to its code for pro-
  ducing a sequence of instructions followed by the
  code to which it responded,
 means in said predetermined one of said separate
  routine planned logic arrays which called said an-
  other one of said separate routine planned logic
  arrays responsive to the code generated thereby to
  resume the read out of its sequence of instructions.

8. In a data processing system as recited in claim 6
wherein there is also included peripheral apparatus for
operation in comjunction with said data processing
system,
 said plurality of separate routine planned logic array
  means includes a planned logic array means re-
  sponsive to specific code signals at its inputs for
  generating a sequence of instructions for ordering
  operation of said peripheral apparatus with said
  main data processing means.

9. In a data processing system as recited in claim 6
wherein each said separate planned logic array means and said master program memory means each com-
prises an array of AND gates to which said inputs are
connected,
 an array of OR gates connected to receive outputs
  from said array of AND gates and having some of
  their outputs connected to said outputs, and
 a plurality of flip flop means connected to receive
  others of the outputs of said OR gates and to apply
  their outputs as inputs to said array of AND gates.

10. A system for generating the instruction signals
required for instructing a data processing system, in-
cluding a memory means and a data processor, to pro-
cess data comprising
 a plurality of planned logic array means, a first of
  which includes means for generating a sequence of
  sets of sub-routine call signals, others of which
  include means for generating a sequence of instruc-
  tion signals for ordering data processing operations
  by said data processing system in response to a
  particular set of sub-routine call signals,
 some of said others of said planned logic array means
  including means for generating a set of sub-routine
  call signals at the conclusion of a sequence of in-
  struction signals for enabling said first of said
  planned logic array means to generate the next set
  of sub-routine call signals in a sequence, and
 others of said planned logic array means including
  means for generating a set of sub-routine call sig-
  nals at the conclusion of a partial sequence of in-
  struction signals for enabling another of said others
  of said planned logic array means to generate a
  sequence of instruction signals for ordering data
  processing in response,
 said another of said planned logic array means in-
  cluding means for generating a set of sub-routine
  call signals at the conclusion of generating its in-
  struction signals identical with the set of sub-rou-
  tine call signals to which it responded,
 said other of said planned logic array means which
  generated the calling set of sub-routine call signals
  at the conclusion of a partial sequence of instruc-
  tion signals including
 means for resuming the sequence of instruction sig-
  nals in response to said identical set of sub-routine
  call signals,
 data bus means and command bus means intercon-
  necting all of said plurality of planned logic array
  means for enabling the transfer of a set of said
  sub-routine call signals to said others of said
  planned logic array means whereby one of said
  others of said planned logic array means is enabled
  to generate a sequence of instruction signals,
 for further enabling the transfer of a set of subroutine
  call signals by others of said planned logic array
  means to said first of said planned logic array
  means,
 for further enabling a set of sub-routine call signals
  from others of said planned logic array means to
  another of said others of said planned logic array
  means, and
 for further enabling transfer of an identical set of
  sub-routine call signals from said other of said
  planned logic array means to said other of said
  planned logic array means which generated the
  calling set of sub-routine call signals at the conclu-
  sion of a partial sequence of instruction signals.

11. In a data processing system having a main mem-
ory means, a control circuit for said main memory means comprising
- a plurality of register circuit means for respectively storing separate address signals for addressing locations in said main memory means,
- means for generating a signal for selecting one of said register circuit means,
- means for generating address increment signals to be added to the address signals stored in one of said register circuit means,
- an adder circuit means,
- means for generating a register circuit means read out signal,
- means responsive to a register circuit means selecting signal and to a register circuit means read out signal for transferring the address signals stored in the register circuit means selected by said selected signal into said adder circuit means,
- means for entering address increment signals into said adder circuit means to be added to the address signals therein to provide new address signals,
- means for generating a register circuit means write signal,
- means responsive to said register circuit means write signal and to a register circuit means selecting signal for transferring the new address signals from said adder to the register circuit means selected by said selecting signal, and
- means for addressing said main memory means with the new address signals stored in said selected one of said register circuit means.

12. In a data processing system as recited in claim 11 wherein there is included planned logic array means for storing a sequence of instruction signals for said main memory means,
- bus means connecting said planned logic array means to said adder circuit means, and
- means for sequentially reading said sequence of said instruction signals out of said planned logic array means onto said bus means.

13. In a data processing system as recited in claim 11 wherein said means for generating a signal for selecting one of said register circuit means comprises
- a planned logic array means having a first predetermined circuit portion;
- said means for generating address increment signals comprises a second predetermined circuit portion of said planned logic array means
- said means for generating a register circuit means read out signal comprises a third predetermined circuit portion of said planned logic array means; and
- said means for generating a register circuit write signal comprises a fourth predetermined circuit portion of said planned logic array means.

14. In a data processing system having a main memory means, an address generating system for said main memory means comprising
- a plurality of register means for respectively storing separate address signals for addressing locations in said memory
- an adder circuit means including means for sequentially generating a plurality of sets of address signals,
- means for generating selection signals for directing the transfer of each set of address signals from said adder circuit means to a specific register means,
- gate means responsive to said selection signals for enabling transfer of a set of address signals to a specific register means,
- means for generating address increment signals,
- means for directing the transfer of a set of address signals from one of said plurality of register means to said adder means,
- means for transferring said address increment signal to said adder means to be added to said set of address signals already in said adder means, and
- means for transferring the output of said adder means to one of said plurality of register means.

* * * * *